United States Patent [19]

Lippel

[11] Patent Number: 4,758,893
[45] Date of Patent: Jul. 19, 1988

[54] CINEMATIC DITHERING FOR TELEVISION SYSTEMS

[75] Inventor: Bernard Lippel, West Long Branch, N.J.

[73] Assignee: Quanticon Inc., West Long Branch, N.J.

[21] Appl. No.: 779,254

[22] Filed: Sep. 23, 1985

[51] Int. Cl.⁴ .............................................. H04N 5/30
[52] U.S. Cl. ...................................... 358/209; 358/37
[58] Field of Search ................... 358/13, 37, 133, 138, 358/209, 11; 340/728

[56] References Cited

U.S. PATENT DOCUMENTS

| | | | |
|---|---|---|---|
| 3,244,808 | 4/1966 | Roberts | 358/133 |
| 3,739,082 | 6/1973 | Lippel | 358/133 |
| 4,275,411 | 6/1981 | Lippel | 358/13 |
| 4,460,924 | 7/1984 | Lippel | 358/13 |
| 4,568,966 | 2/1986 | Lippel | 358/13 |
| 4,617,597 | 10/1986 | Lippel | 358/310 |
| 4,652,905 | 3/1987 | Lippel | 358/13 |

Primary Examiner—L. T. Hix
Assistant Examiner—David M. Gray

[57] ABSTRACT

Dither-quantizing with Cinematic Dithers permits coarse quantization of the Nyquist samples transmitting television luminance or chrominance in analog or digital signals. Means are disclosed for generating improved p-phase Cinematic Dithers corresponding to any desired value of p and to liberal choice in the number of dither sizes. In general, a selected random or ordered basic arrangement of the dither is altered cyclically from frame to frame and recurs every p television frames. The frame-to-frame changes are also tailored to the spatial and temporal filtering characteristics of the human visual system in order that the Nyquist samples can be restricted to very few amplitude levels without corresponding impairment of perceived picture quality.

49 Claims, 7 Drawing Sheets

FIG. 1

FRAME 1 (31)
```
3 1 4 1 0
2 1 0 3 1 4
4 3 1 2 3 0
2 3 1 4 3
```

FRAME 2 (34)
```
0 3 1 3 2
4 3 2 0 3 1
1 0 3 4 0 2
4 0 3 1 0
```

FRAME 3
```
2 0 3 0 4
1 0 4 2 0 3
3 2 0 1 2 4
1 2 0 3 2
```

FRAME 4
```
4 2 0 2 1
3 2 1 4 2 0
0 4 2 3 4 1
3 4 2 0 4
```

FRAME 5
```
1 4 2 4 3
0 4 3 1 4 2
2 1 4 0 1 3
0 1 4 2 1
```

FRAME 6
```
3 1 4 1 0
2 1 0 3 1 4
4 3 1 2 3 0
2 3 1 4 3
```

FIG. 9

FRAME 1

$x_0$ (31):
```
3 1 ④ 1 0
2 1 0 3 1 4
4 3 1 2 3 0
2 3 1 4 3
```

$+$ $y$:
```
0 2 ① 3 0
1 3 0 2 1 3
0 2 1 3 0 2
1 3 0 2 1
```

$=$ $z_0$ (33):
```
12 6 ⑦ 7 0
9 7 0 14 5 19
16 14 5 11 15 2
9 15 4 18 13
```

FRAME 2

CINEMATIC DITHERING FOR TELEVISION SYSTEMS

This invention concerns improvements in systems transmitting television information by means of dither-quantized signals. It is related to the following U.S. Pat. Nos. and copending applications:

[1] U.S. Pat. No. 4,275,411, "Dither-Quantized Signalling for Color Television"

[2] U.S. Pat. No. 4,460,924, "Dither-Quantized Signalling for Color Television" (continuation of [1])

[3] Ser. No. 354,138, "Compatible Color Television with Regenerable Signals", (continuation-in-part of [2]), now U.S. Pat. No. 4,568,966.

[4] Ser. No. 697,052, now U.S. Pat. No. 4,652,905, "Instantaneous Neutral Colors in Dither-Quantized Color Television". (continuation-in-part of [3])

[5] U.S. Pat. No. 3,739,082, "Ordered Dither System".

DEFINITIONS

A signal is dithered by adding a dither thereto, and Nyquist samples of the dithered signal may be restricted to discrete amplitudes, called quantum levels, to form a dither-quantized signal. A dither consists of a stream of samples, preferably at the Nyquist rate of the signal to be dither-quantized. Dither samples are assumed to be confined to a limited number of positive and negative amplitudes, and it is conventional to designate the amplitudes, in increasing order, by successive non-negative integers, called herein sizes. For particular operations disclosed hereinbelow, amplitudes may be altered or combined according to corresponding arithmetic operations on the sizes.

Although usually realized as a one-dimensional stream of samples, a dither for dither-quantizing a component video signal of television is more conveniently defined in terms of a virtual counterpart consisting of frame patterns occurring at frame rate. The term "frame pattern" is used herein to denote a 2-d array of dither sizes; just as scanning of the TV picture generates one-dimensional video signals, scanning of a frame pattern would transmit the dither sizes in a one-dimensional stream, in a sequence that depends on the arrangement of sizes on the frame pattern. (There is established usage according to which the term "dither" may sometimes refer to dithers generally to be synonymous with "dithering"; such variant meanings are apparent from the contexts.) Video signals having significantly different bandwidths (e.g. luminance component and chrominance components) may be dithered according to frame-pattern arrays comprising different numbers of elements.

If the dither repeats without change from frame to frame, there is only one frame pattern and the dither is called stationary or 2-d. If the dither changes from frame to frame, corresponding to a temporal sequence of different frame patterns, the dither is 3-d. The term "cinematic dither" is used herein to refer to 3-d dither that repeats after two or more frames; if it repeats afater p frames, it is p-phase dither and can be specified by p frame patterns. It can also be envisioned that p-phase dither corresponds to an array of elements corresponding to sizes, on which the size assigned to an element changes continually in a cycle of p sizes. Such repetitive change in the size of an element I call cycling. The difference between two successive sizes of a cycle is a jump, and the total change between non-successive sizes is a cumulative jump.

A frame pattern that is formed by horizontal and vertical repretition of a subpattern (called the dither matrix) is said to be ordered, or to exhibit ordered dither.

BACKGROUND

Use of dither-quantizing with stationary dithers to reproduce photographs by means of coarsely-quantized dot samples is well known. A black-and-white picture, for example, is reproduced with a stippled texture correpsonding to oscillations between two adjacent quantum levels of the gray scale, and the psychovisual system performs low-pass filtering of this texture to give the human observer the impression of intermediate grays. Ordered dithers can be designed to minimize the visibility of the stippled textures while also preserving pictorial information which the same gray-scale quantizing would otherwise have destroyed. These ordered-dither patterns have also been used in stationary dithers for television signals; reference [5] teaches the use of a particular variety, based on nasik dither matrices, that, unlike other well-known and efficient ordered dithers, can be oriented to avoid large-area flicker on TV displays having the usual 2:1 lines interlace. Nasik dithers and similar optimal ordered dithers of prior art always have a number of dither sizes that is an integral power of 2.

The perceived picture quality suffers, in respect to both transmitted information and the visibility of stipple, if the dither samples of a stationary ordered dither pattern are redistributed in random fashion. However, processing at a TV receiver to subtract the identical random frame pattern from a received signal (following Roberts, U.S. Pat. No. 3,244,808) inserts additional grays between the quantum levels in a manner that reduces the r.m.s. error by half, improving the random-dithered picture. Optimal ordered dithers neither require nor benefit from such subtraction and provide equal or better picture quality with a much simpler system. Roberts generates stationary random dither by means of a pseudo-random sequence generator that is reinitialized for each frame, insuring a fixed frame pattern; prolonging the sequence to provide 3-d random dither with uncorrelated frame patterns would impair the picture quality.

Prior-art 3-d television dithering is found in Thompson and Sparkes ("A Pseudo-Random Quantizer for Television Signals"; *Proc. IEEE*, vol. 55, no. 3, March 1967) and in References [1]–[5]. The system of Thompson and Sparkes is similar to that of Roberts, adding a dither before quantizing and subtracting the same dither at the receiver, except that the former combine Roberts' stationary dither with a 2-phase cinematic dither comprising only two sizes arranged according to a checkerboard frame pattern that reverses every other frame. Reference [5] describes cinematic dithers having either eight or sixteen sizes and a number of phases that is an integral power of 2. The frame patterns are nasik-type ordered-dither patterns and cycling of the sizes on a pattern element is achieved by negating bits in the binary numbers representing the eight or sixteen sizes. This causes all sizes to cycle according to one sequence on half of the elements and in reverse order on the remaining elements. Generation of such cinematic nasik dithers is also described in Reference [1], [2] and [3].

Nasik frame patterns are typical of of ordered-dither patterns having the number of dither sizes equal to an integral power of 2 for optimum dither-quantizing of still pictures. Efficient cinematic dithers construction from such frame patterns need a number of phases that is also a power of 2.

Reference [5] discloses the use of cinematic dithering in a monochrome TV system, and References [1] through [4] disclose their use in color-television systems. Dither-quantizing reduces the number of bits per sample needed in digital television signals; and in other systems, including NTSC-compatible systems, it makes signal regeneration possible and facilitates encrypted transmission.

OBJECTS OF THE INVENTION

An object of the invention is to provide better dithering than has hitherto been available for dither-quantizing television signals.

Another object is to provide optimal cinematic dithers corresponding to any convenient number of phases.

Another object is to provide optimal cinematic dithers corresponding to a larger choice of the number of dither sizes than has hitherto been available.

Another object is to provide optimal cinematic dithers corresponding to a larger variety of arrangements of sizes into frame patterns than has hitherto been available.

Another object of the invention is to provide cinematic dithers particularly suited to the scanning rasters of standard broadcast TV systems.

A further object of the invention is to provide means for generating cinematic dithers meeting any of the aforementioned objects.

A further object of the invention is to provide better dither-quantized television signalling than has hitherto been available.

SUMMARY OF THE INVENTION

The invention concerns the generation and use of novel cinematic dithers for systems transmitting television pictures by means of dither-quantized component signals.

A novel dither of the invention may be based on an essentially arbitrary, random or ordered, 2-dimensional frame pattern that is modified from frame to frame according to a cycle repeating after p frames (p any reasonably small integer). The size corresponding to a pattern element changes from frame to frame in such manner that samples of the transmitted signals may be restricted to very few levels of amplitude and there is less impairment of picture quality than has heretofore been possible.

DRAWINGS

FIG. 1 illustrates a particular 5-phase dither of the invention, according to which five dither sizes are arranged according to five different random patterns on Frames 1-5 and return to the arrangement of Frame 1 on Frame 6.

FIG. 9 shows Frames 1 and 2 of a 5-phase dither having 20 sizes and the relation to the 5-phase dither of FIG. 1 and a stationary dither.

Figure 6:
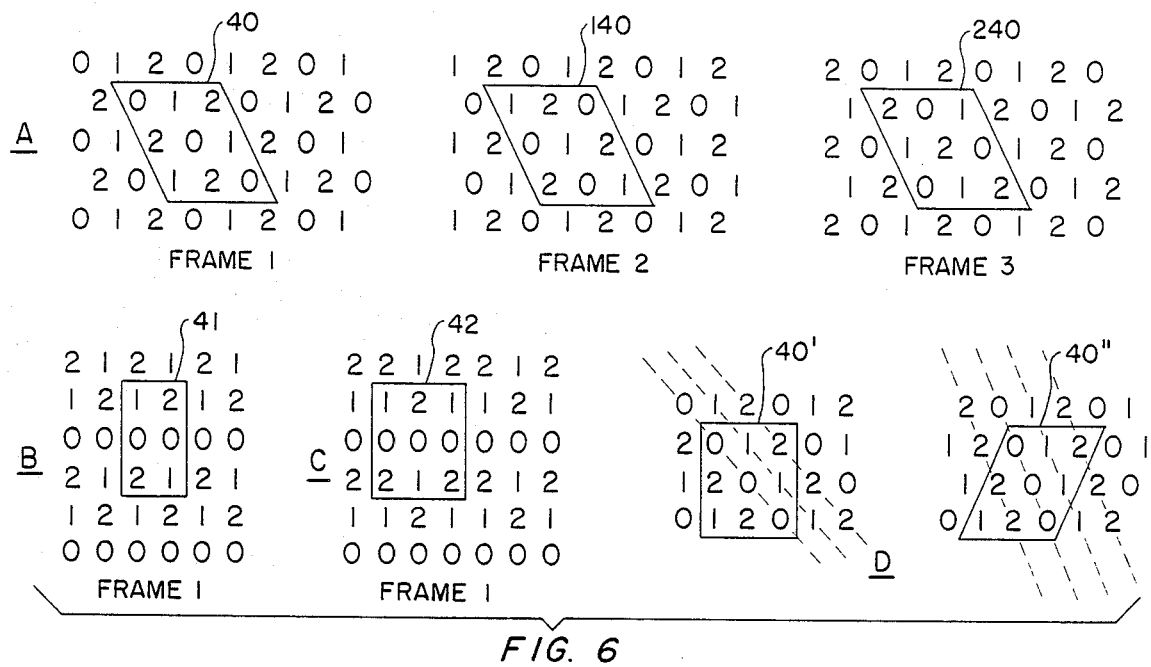
FIG. 6 shows 3-phase dithers having ordered-dither frame patterns and cycling according to FIG. 2A.
Figures 10, 11:
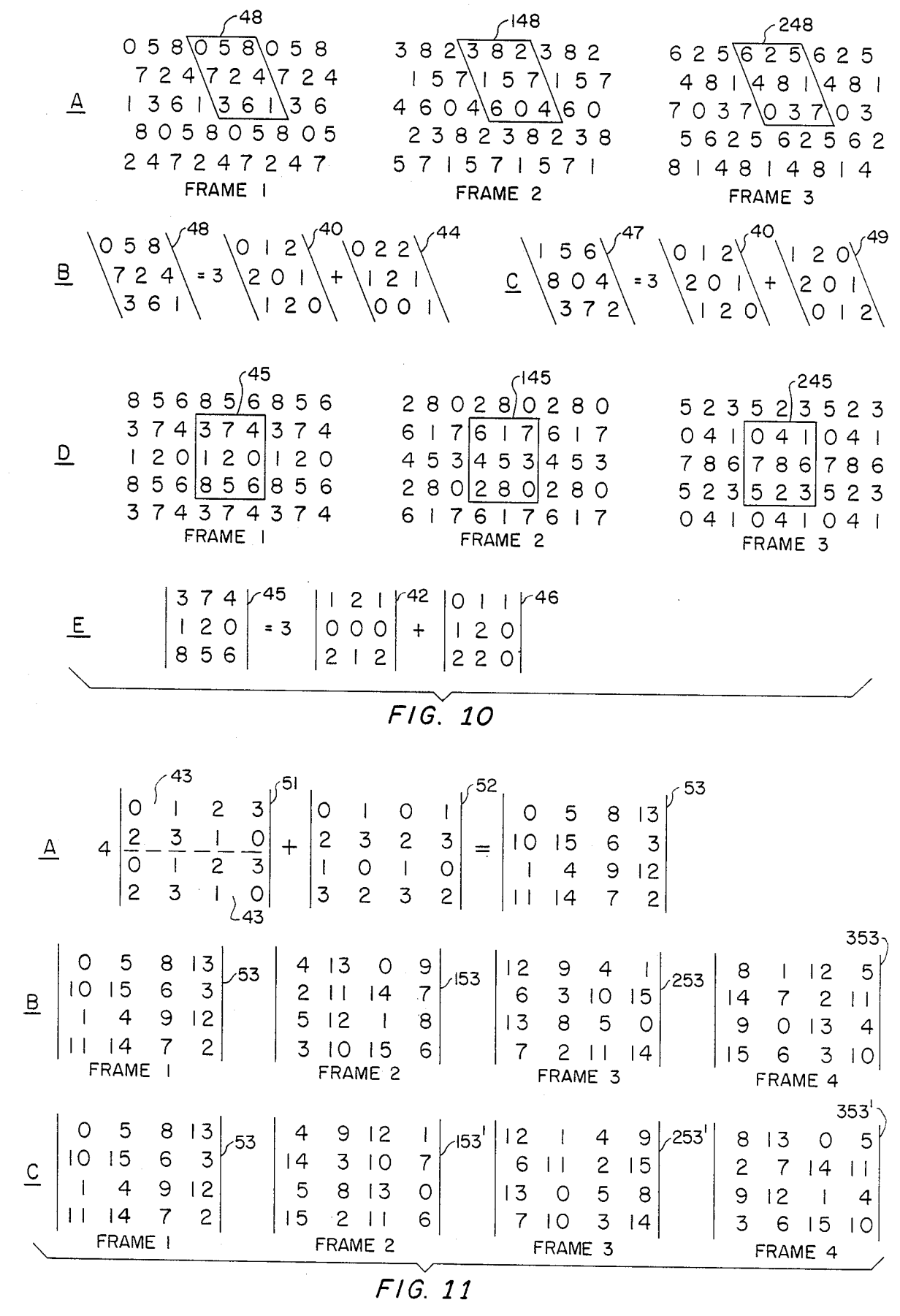

FIG. 10 shows frame patterns and dither matrices for 3-phase dithers having nine sizes and their relation to dithers of FIG. 6 in combination with stationary dithers.

FIG. 11 shows ordered-dither matrices for Frames 1-4 of cinematic dithers having 16 sizes and their relation to a cinematic-dither matrix and a stationary-dither matrix.

Figure 12:
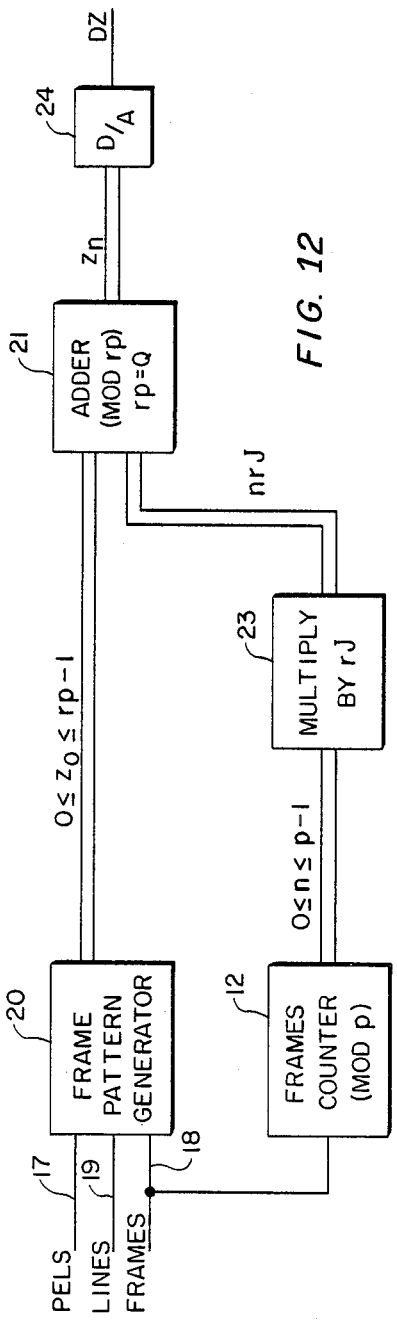

FIG. 12 is a simplified diagram showing means for generating a multi-cycle cinematic dither having the same fixed jump in all of the concurrent cycles.

Figure 13:
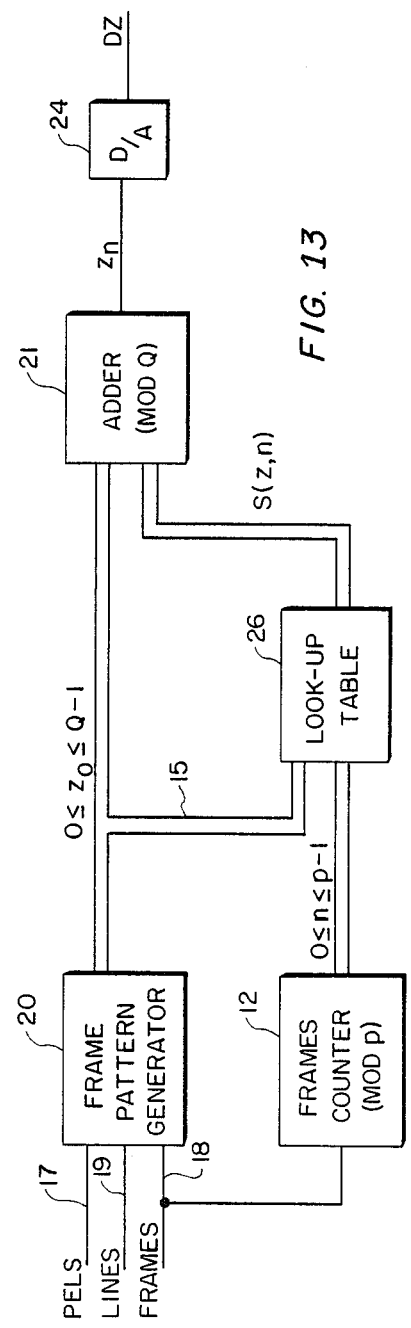

FIG. 13 show simplified means for generating cinematic dithers including, but not restricted to, multi-cycle dithers with fixed or variable jumps in concurrent cycles.

Figure 14:
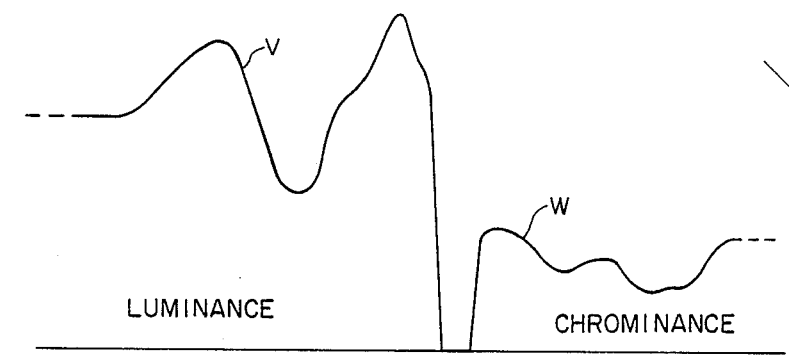
Figure 14:
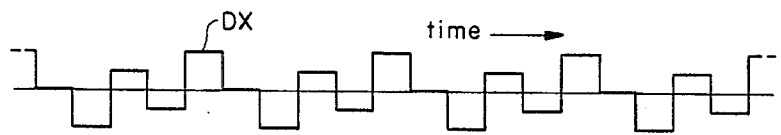
Figure 14:
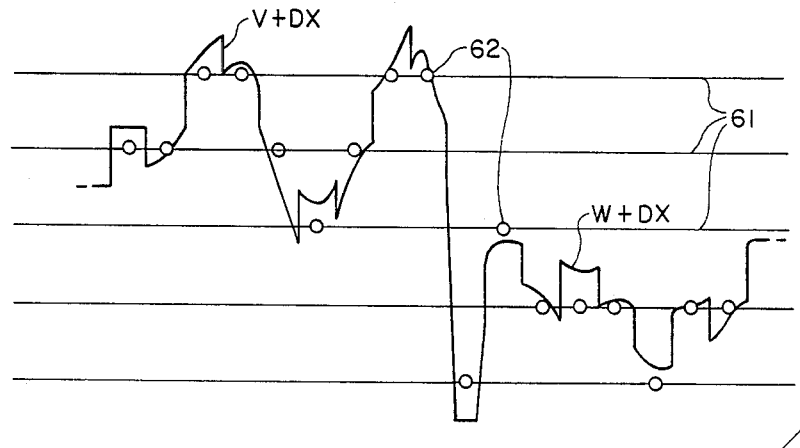

FIG. 14 illustrates dither-quantizing of part of a signal transmitting color television by means of multiplexes analog components.

DETAILED DISCLOSURE

The invention makes use of cinematic dithers that can be constructed for any whole number of phases by means disclosed herein. Exemplary dithers of the drawings and specification have relatively small number of phases, particularly useful in connection with the NTSC system and related systems of television.

One-Cycle Species

The invention may utilize cinematic dithers of a first species exemplified in FIGS. 1, 2, 3, 6 and 7 and characterized by an equal number of phases and dither sizes; during a p-phase dither cycle, each element of the frame pattern changes from frame to frame and takes on p different sizes.

FIG. 1 shows a fragment of the Frmes 1-6 frame patterns for a dither having frame-to-frame changes diagrammed in FIG. 2B. It can be ascertained that a pattern element cycles through sizes 0, 2, 4, 1, 3, ... etc., in that order, and returns to the same size on Frame 6 that is had on Frame 1. The cycle of sizes corresponds to repeated addition of 2 (modulo 5).

Figure 2:
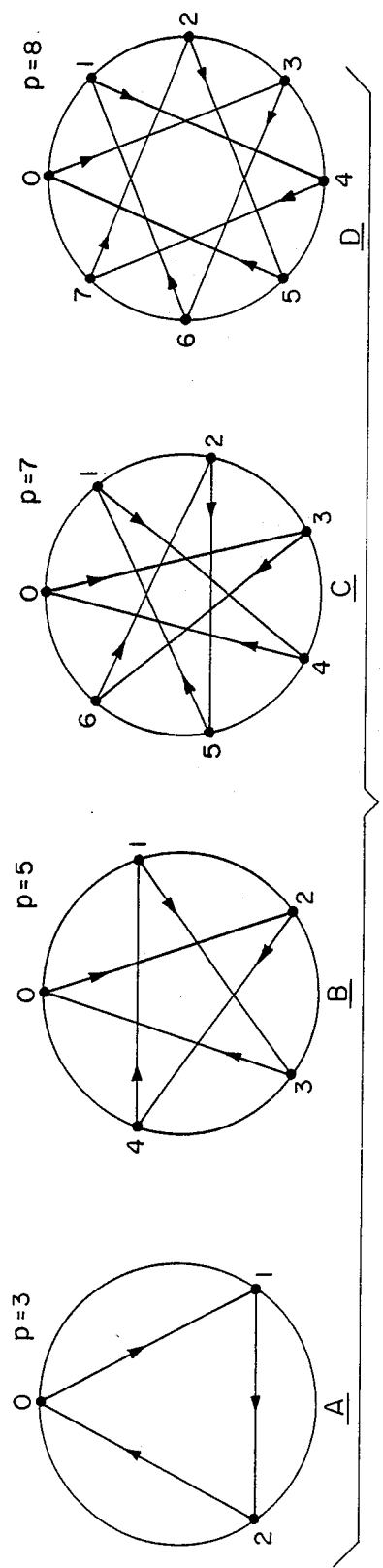
FIG. 2 shows exemplary circle diagrams each corresponding to a cycle of sizes characterized by equal jumps in size.

The circle diagrams shown at A, B, C and D of FIG. 2 represent such size cycles for dithers having three, five, seven and eight phases, respectively. In general, a p-phase dither of this variety has sizes in the range $0 \leq x \leq p-1$, and the sizes change according to successive modulo-p additions of a positive constant J that is the largest integer smaller than $\frac{1}{2}p$. (Another positive integer, $J'=p-J$, gives the same cycle in reverse order; therefore J is assumed less than $\frac{1}{2}p$ in FIGS. 2 and 8.)

When J and p have a common factor, a constant "jump" J does not work. For example: p=6 leads to J=2 and a cycle that repeats after only three frames. However, six jumps that vary according to the cycle 3,2,2,3,4,4 ... give rise to the 6-phase cycle of sizes 0,3,5,1,4,2 ... depicted at B of FIG. 3, of to any of five other cycles that occur when the same cycle of jumps commences with a size other than 0. The 8-phase cycle shown in FIG. 3C, has jumps cycling as 4, 3, 3, 3, 4, 5, 5, 5 ... (corresponding to 3.25 mean absolute difference), instead of a fixed jump of 3 as in FIG. 2D. It should be noted that all jumps in the p-phase cycles of FIGS. 2 and 3 are restricted to positive integer values that are $\frac{1}{2}$p, the largest integer smaller than $\frac{1}{2}$p, or the smallest integer larger than $\frac{1}{2}$p; this tends to maximize the absolute differences (modulo p) between successive sizes.

Figure 3:
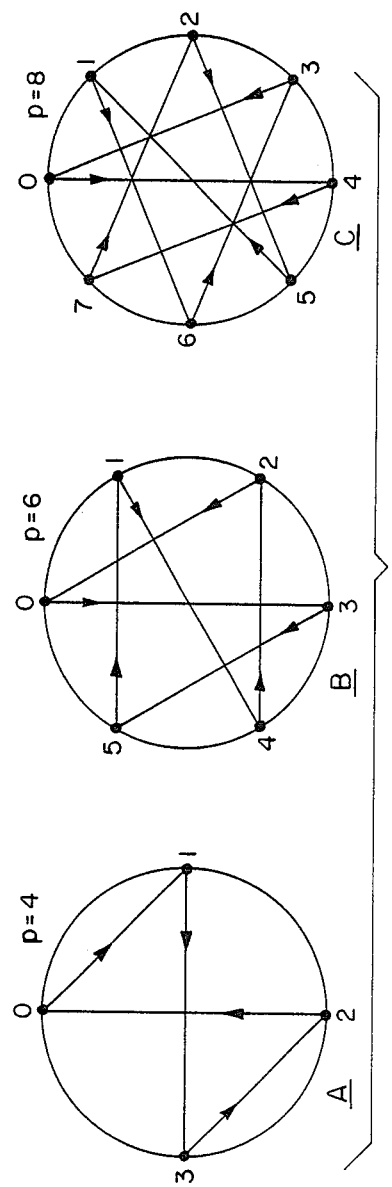
FIG. 3 shows circle diagrams each corresponding to a cycle of sizes characterized by variable jumps in size.
Figure 4:
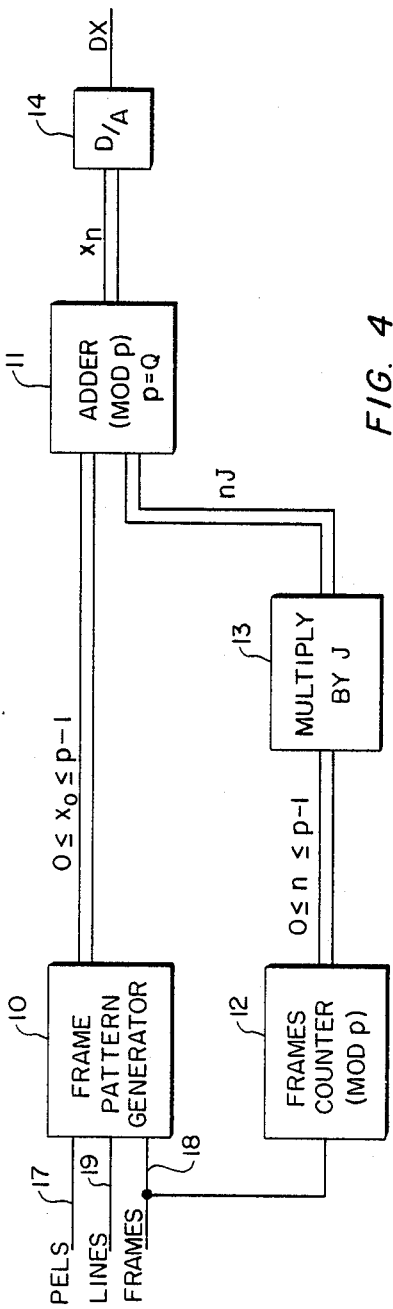
FIG. 4 is a simplified diagram showing means for generating a cinematic dither that cycles in the manner of FIG. 2.
Figure 5:
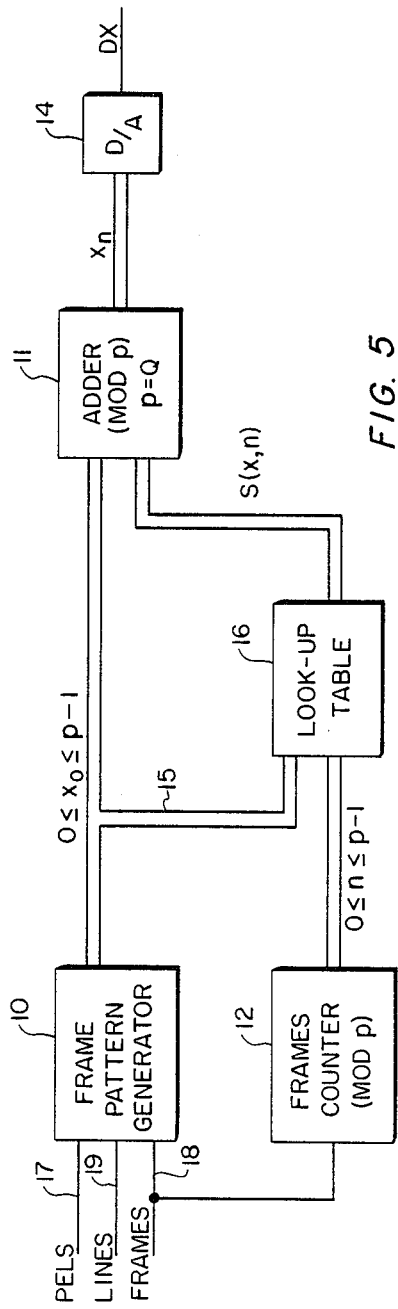
FIG. 5 is a simplified diagram showing means for generating cinematic dithers including dithers cycling in the manner of FIG. 3.

FIG. 4 shows means for generating dithers having the fixed size-jumps depicted in FIG. 2, and FIG. 5 shows a variation also suitable for dithers having the variable jumps exemplified in FIG. 3. (Double lines on these and other figures of the present disclosure signify transmission paths for digital signals, single lines being used for analog signals and clock signals.) Referring to FIG. 4, generator 10 is a 2-d dither generator of prior art, arranged to generate, in synchronism with pels clock 17, a stream of numbers ($x_o$'s) representing the sizes of dither samples in digital form. The frequency of clock 17 is preferably the Nyquist rate for the signal to be dither-quantized. Sample sizes in the range $0 \leq x_o \leq p-1$ are substantially equiprobable and recur in a sequence that repeats after frame-sync 18, corresponding to a basic frame pattern arbitrarily assigned to Frame 1 of the cinematic dither. For generating randomized frame patterns like those of FIG. 1, generator 10 may be a random sequence generator of prior art, arranged to generate the numbers 0 through p−1 at pels rate and to be reinitialized with frames-sync 18; no lines-sync is needed. Alternatively, and likewise according to prior art, unit 10 may generate an ordered-dither pattern for Frame 1; it may, for example, employ counters and number-translating circuitry analogous to those described for nasik-type frame patterns in references [3], [5] and [1], line-sync being preferably furnished. Pels-sync 17, frames-sync 18 and lines-sync 19 may be provided by the camera sync generator or derived from transmitted sync signals in a manner described in my copending application Reference [3].

Frames sync 18 is also sent to counter 12 which counts frames modulo-p and delivers count n to digital multiplier 13. The jump constant J, corresponding to the largest integer smaller than $\frac{1}{2}$p, is present into the multiplier. The product nJ, corresponding to an accumulation of jumps, is added to the $x_o$'s in modulo-p adder 11 to form the sampels $x_n$ of Frame n+1. As n cycles from zero through p−1, the stream of $x_n$'s put out by the adder constitutes a p-phase dither in digital form. For systems requiring analog (i.e. PAM) dither samples, d/a converter 14 may be provided to convert to the equivalent pulse-amplitude-modulated dither DX.

FIG. 5 shows the system of FIG. 4 modified to enable it to provide dithers having the varaiable jumps exemplified in FIG. 3, as well as the fixed-jumps depicted in FIG. 2. Specifically, multiplier 13 of FIG. 4 is replaced by look-up table 16. With connection 15 in place, the table input consists of both $x_o$ and n, and the corresponding output from the table is a cumulative jump S(x,n) that varies from sample to sample such that all elements of the frame patterns follow the same cycle of sizes. I may, for example, store Table I in the look-up table to generate, by cumulative jumps, the particular dither depicted in FIG. 3B.

TABLE I

| | Cumulative Jump, S (x,n) | | | | | |
|---|---|---|---|---|---|---|
| | n = | | | | | |
| $x_o =$ | 0 | 1 | 2 | 3 | 4 | 5 |
| 0 | 0 | 3 | 5 | 1 | 4 | 2 |
| 1 | 0 | 3 | 1 | 5 | 2 | 4 |
| 2 | 0 | 4 | 1 | 3 | 5 | 2 |
| 3 | 0 | 2 | 4 | 1 | 5 | 3 |
| 4 | 0 | 4 | 2 | 5 | 1 | 3 |
| 5 | 0 | 2 | 5 | 3 | 1 | 4 |

I may sometimes omit connection 15 so that only n, and not $x_o$, is furnished to the lookup table of FIG. 5 and the table output remains constant for a full frame. If the interframe jumps are unequal (as in FIG. 3), it is then not possible for all of the pattern elements to rotate through the same cycle of changes because all sizes are present on all frames. Assume, for example, that the table output is S(O,n) of Table I, regardless of $x_o$. In that case, only one element in six (one that has size 0 on Frame 1) follows the 0, 3, 5, 1, 4, 2 cycle and the remaining elements rotate through five other cycles.

Referring again to FIG. 1, it will be seen that Frame 1 is substantially random; this results in equally random frame patterns on Frames 2–5 which are derived therefrom by interchange of sizes. Such randomness mitigates against perceptible flickers and pattern crawls in the perceived TV picture, even with the conventionally interlaced scanning. Furthermore, aliasing effects due to subsampling in the stipple are less likely to be conspicuous when the frame patterns are random, not ordered.

Conversely, arrangement of the sizes on Frame 1 according to a regular pattern results in similar regularity on the remaining frames; only transformations of the dither matrix need be considered for ordered dither patterns. I prefer to avoid certain ordered-dither patterns that may result in visible dynamic artifacts. When p is an integral power of 2, the use of nasik patterns to avoid such artifacts is known in the prior art.

FIG. 6 exemplifies ordered-dither frame patterns for the one-cycle species, assuming 3-phase dithers based on sizes 0, 1 and 2 and the frame-to-frame cycle of sizes shown in FIG. 2A. The dither shown at A of FIG. 6 has the Frame 1 pattern defined by a 3×3 matrix, labelled 40, which becomes 140 of Frame 2 and 240 of Frame 3 so that the frames change likewise. The dither elements are preferably arranged in hexagonal array (corresponding to hexagonally arranged Nyquist samples), and matrices are skewed as shown to avoid concentrating like-sized elements along distinct parallel lines, like the elements found along the dotted lines of matrices 40' and 40'', shown at D of FIG. 6. Matrix 40' is the same as 40 with the elements in rectangular array, while matrix 40'' is like 40 but skewed in the opposite direction. As the sizes rotate from frame to frame, the indicated lines of these two matrices would progress uniformly across the scanning raster and might result in noticeable texture crawls across the TV screen.

FIG. 6 also shows two other examples of ordered-dither patterns for the 3-phase dither, namely those corresponding to the 2×3 dither matrix 41, shown at B, and the 3×3 matrix 42, shown at C. The fact that a dither matrix is three lines high insures that the corresponding dither will not cause large-area flicker on a TV display having the conventional 2:1 line interlace.

Figure 7:
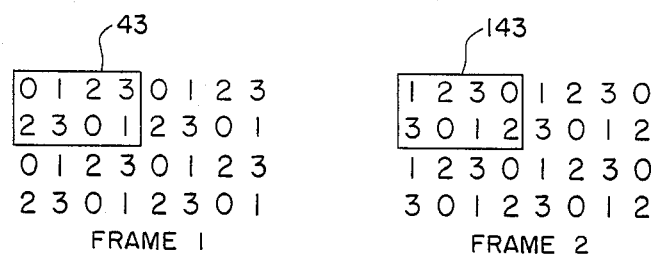
FIG. 7 shows a 4-phase dither that has ordered-dither frame patterns and that cycles in the manner of FIG. 3A.

FIG. 7 shows ordered-dither frame patterns for a 4-phase dither having four sizes. Cycling according to FIG. 3A transforms matrix 43 of Frame 1 into 143 of Frame 2, 243 of Frame 3 and 343 of Frame 4.

Persons skilled in the art will understand that ordered-dither frame patterns described herein are not necessarily optimal for 2-d dithering such as may be used to dither-quantize a still photograph, and that I may construct cinematic dithers with either random or ordered frame patterns.

Multi-Cycle Species

A second species of dithers according to the invention includes p-phase dithers having rp dither sizes that fall into r groups of p, the sizes within each group changing from frame to frame in a cycle of p frames.

Let x, y and z be integers, with $0 \leq z \leq rp-1$ representing the rp dither sizes; then the possible values of z correspond to $z=rx+y$, computed for all $0 \leq x \leq p-1$ and all $0 \leq y \leq r-1$. For example, sizes 0 through 19 of FIG. 8B correspond to $z=4x+y$ for all x from 0 through 4 and all y from 0 through 3.

Figure 8:
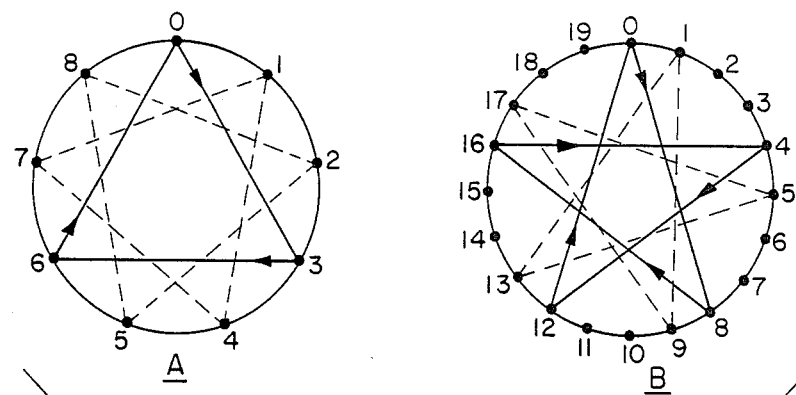
FIG. 8 shows circle diagrams exemplifying cycling with plural concurrent cycles, the same fixed jump occurring in every cycle of a set of concurrent cycles.

The circle diagrams of FIG. 8 represent a preferred subspecies characterized by r groups whose concurrent cycles can be represented by one figure repeated with r different angular orientations. It will be clear to persons skilled in the art that $z_n=rx_n+y$ for this subspecies (the subscript n indicating the frame of a cinematic dither), and that $x_n$ can be obtained from a one-cycle dither while y comes from a stationary dither. I prefer that the x dither shall cycle like those of FIG. 2 or FIG. 3, thereby maximizing the psychovisual suppression of dither-quantizing artifacts due to it; residual stipple effects attributable to the y component have relatively low contrast and are hard to perceive on the TV picture. Fixed or variable jumps in $z_n$ are merely the corresponding $x_n$ jumps multiplies by r.

FIG. 8A illustrates 3-phase cycling of nine dither sizes. The solid-line figure (like that of FIG. 2A) shows that 1, 3 and 6 progress through one cycle and dottle lines show two concurrent cycles, one for 1, 4 and 7, the other for 2, 5 and 8. FIG. 10 shows possible frame patterns for the nine sizes. In like fashion, FIG. 8B shows how I may provide twenty dither sizes with 5-phase cycling based on the cycle of FIG. 2B. There are four concurrent cycles, including 0, 8, 16, 4, 12 (shown by means of a solid-line figure like FIG. 2B with all sizes quadrupled), 1, 9, 17, 5, 13 (shown by means of a dotted figure), and cycles 2, 10, 18, 6, 14 and 3, 11, 19, 7, 15 whose figures have been omitted in the interest of clarity.

Fragments 31-35 of FIG. 9 show portions of Frames 1 and 2 of a dither having the 5-phase cycle of FIG. 8B, anad also show the theoretical x and y components thereof. Specifically, 31 and 34 have the random patterns shown in FIG. 1 (the x pattern) while 32 has four sizes arranged here in a stationary ordered-dither pattern (the y pattern). Typical element $x_o$ of 31 (size 4 shown circled) is combined with corresponding element y of 32 (size 1 shown circled) so that the resultant $z_o$ on 33 (size 17 shown circled) is $(4x_o+y)$ mod 20. Elements of Frame 2, shown on 35, could be computed in like fashion, using $x_1$ of 34 (size 1 circled) instead of $x_o$; however, recalling that $x_1=(x_o+2)$ mod 5 in FIG. 1, it will be seen that $z_1=(z_o+8)$ mod 20. Therefore 35 is obtainable directly from 33, merely by by adding eight units modulo 20 to each element of 33; and subsequent frame patterns are obtainable likewise by modulo-20 jumps of 8, or else by modulo-20 addition of 8n to the elements of Frame 1 to obtain Frame n+1.

Inasmuch as only ordered-dither patterns are shown in FIGS. 10 and 11, it is sufficient to discuss the dither matrices. FIG. 10B shows the 3×3 matrix 40 of FIG. 6A multiplied by three and added to 3×3 matrix 44 to form matrix 48, which has nine sizes of dither. (FIG. 10C is similar, except that matrix 44 is replaced by matrix 49.) FIG. 10A shows Frame 1 with matrix 48 outlined, and tesselation of the matrix forms the frame pattern. Frame-to-frame jumps of three size units modulo 9 transform the matrices into 148 of Frame 2 and 248 of Frame 3; or else cumulative jumps modulo 9, of six and nine units respectively, could be applied directly to 48. Continuing the process for another frame would effect a return to matrix 48.

The 3-phase ordered dither shown at FIG. 10D has the same nine dither sizes as FIG. 10A but the Frame 1 matrix is 45 and the elements are in rectangular array. As shown at E, matrix 45 can be decomposed into matrix 42 of FIG. 6C in combination with matrix 46. Frame-to-frame cycling may be accomplished by means of the same jumps for all of the frame patterns shown in FIG. 10.

FIGS. 10 and 11 have ordered-dither matrices of such size, and so arranged, that all rp dither sizes are shown, corresponding to p sizes in x and r sizes in y. Persons skilled in the art will understand that I may use either ordered or random frame patterns for the x and/or the y components of a dither of this species, and that the TV raster is assumed to include a sufficient number of dither elements to insure high probability of all rp sizes when a component pattern is random.

Only dither matrices are shown for ordered-dither frame patterns in FIG. 11. At A, the 4x4 matrix 51 (corresponding to two matrices 43 of FIG. 7A, shown separated by a dotted line) is shown quadrupled and added to matrix 52 to form 53 for Frame 1. Cycling the four sizes of 51 according to FIG. 3A is equivalent to cycling the 16 sizes of 53 by means of frame-to-frame jumps that depend on the size, resulting in Frames 2, 3 and 4, shown at B of FIG. 11, in which the matrices are 153, 253 and 353, respectively.

FIG. 12 shows the means of FIG. 4 modified to generate multi-cycle dithers characterized by constant interframe jumps as exemplified in FIGS. 8, 9 and 10. For a p-phase dither, generator 20 produces a stream of digital numbers $z_o$ running from zero through rp−1 in a sequence pattern that is synchronized with frame sync 18 and repeats from frame to frame. Counter 12 counts the frame sync pulses modulo p, the count n is multiplied by a constant factor rJ in digital multiplier 23, and the product nrJ is added to each $z_o$ in digital adder 21. The adder output $z_n=z_o+nrJ$ (mod rp) corresponds to the dither pattern for Frame n+1; during Frame 1 of the p-frames cycle, when n=0, it is the same as the 2-d pattern from generator 20. Optional a/d converter 24 handles $z_n$ values from zero through rp−1.

Although FIG. 8 shows only cycling with constant jumps (related to the uniform jumps in FIG. 2) the jumps may also vary cyclically from frame to frame as in FIGS. 3 and 11. In FIG. 13, multiplier 23 of FIG. 12 is replaced by look-up table 26 whose output S(z,n) is a function of both $z_o$ and the frames count n. The system can therefore generate multicycle dithers having variable and size-denpendent frame-to-frame jumps (even different frame-to-frame jump cycles for different groups of sizes) as well as the constant-jump dithers for which the FIG. 12 system is also adapted. As the stream of $z_o$'s from generator 20 and the frame-count n from counter 12 are delivered to table 26, one value of $S(z-n)$ emerges for each $z_o$. I may conveniently arrange that $S(z, 0)$ is always zero and that $z_n=[z_o+S(z, n)]$ mod Q, the largest $z_n$ value being $Q-1$. Frame 1 of the p-frames cycle has the pattern produced directly by generator 20 and, for Frame n+1, each $z_o$ is converted to $Z_n$. Table II shows the values of $S(z, n)$ by means of which matrix 53 of Frame 1 may be converted to the requisite matrices of Frames 2–4 shown in FIG. 11B.

TABLE II

| $z_o$ | Cumulative Jump S (z,n) | | | |
|---|---|---|---|---|
| | S (z,0) | S (z,1) | S (z,2) | S (z,3) |
| 0–3 | 0 | 4 | 12 | 8 |
| 4–7 | 0 | 8 | 4 | 12 |
| 8–11 | 0 | 8 | 12 | 4 |
| 12–15 | 0 | 12 | 4 | 8 |

As with the system of FIG. 5, I may omit connection 15 of FIG. 13, whereby the cumulative jumps are independent of the dither size and remain constant for an entire frame. Using again matrix 53 of FIG. 11, suppose that look-up table 26 furnishes $\bar{S}(0, n)$ of Table II during the entire Frame n+1: The resulting ordered-dither frame patterns will then correspond to matrices 53, 153', 253' and 353' of FIG. 11C.

Persons skilled in the art will understand that FIGS. 4, 5, 12 and 13 are merely exemplary of processing procedures for dither generating means, and that, in either dedicated or programmable apparatus, I may use various equivalent procedures that will be apparent to such persons. I may, furthermore, record a previously devised cinematic dither on suitable storage means, and arrange to play back analog or digital dither samples, at pels rate and in synchronism with frame-sync signals.

Other Species

I may sometimes generate a species of dither wherein the number of dither sizes is not an integral multiple of the number of phases. For example, I may divide a total of Q dither sizes into a plurality of groups, such that the number of sizes in each group is an integral fraction of p, the number of phase; the number need not be be the same in each group. During the course of p frames, the sizes within each group execute one or more complete rotations, resulting in a p-phase dither that includes Q sizes. Tables III and IV show the frame-to-frame size cycles for two specific examples.

TABLE III

| | Frame Number | | | | | | |
|---|---|---|---|---|---|---|---|
| | 1 | 2 | 3 | 4 | 5 | 6 | 7 |
| Dither Size | 0 | 2 | 4 | 0 | 2 | 4 | 0 |
| | 1 | 3 | 1 | 3 | 1 | 3 | 1 |
| | 2 | 4 | 0 | 2 | 4 | 0 | 2 |
| | 3 | 1 | 3 | 1 | 3 | 1 | 3 |
| | 4 | 0 | 2 | 4 | 0 | 2 | 4 |

TABLE IV

| | Frame Number | | | | |
|---|---|---|---|---|---|
| | 1 | 2 | 3 | 4 | 5 |
| Dither Size | 0 | 3 | 2 | 5 | 0 |
| | 1 | 4 | 1 | 4 | 1 |
| | 2 | 5 | 0 | 3 | 2 |
| | 3 | 2 | 5 | 0 | 3 |
| | 4 | 1 | 4 | 1 | 4 |

TABLE IV-continued

| | Frame Number | | | | |
|---|---|---|---|---|---|
| | 1 | 2 | 3 | 4 | 5 |
| | 5 | 0 | 3 | 2 | 5 |

Table III shows a 6-phase cycle for only five dithers sizes. Sizes 1 and 3 alternate with each other in a 2-frames subcycle, while 1, 2 and 4 rotate in a subcycle of three frames. The entire set of sizes (and therefore any frame pattern constructed therefrom) returns to the Frame 1 state on Frame 7.

Table IV shows a 4-phase cycle for six dither sizes. Sizes 1 and 4 alternate frame-to-frame while the other four sizes rotate through all four frames.

A subcycling cinematic dither with Q sizes can be combined (like single-cycle dithers of the first species) in weighted combination with a stationary or cinematic dither having r sizes to provide Qr dither sizes. The means of FIG. 13 can be adapted to generate subcycling dithers as well as various modifications of the exemplary cinematic dithers which have been described in detail.

In order to disclose the cinematic dithers that I may provide by means of the invention, I have described several examples. Various modifications, combinations and extensions thereof will be obvious to persons having ordinary skill in the art.

I may arrange cycles of frame-to-frame size interchange taking into account both the total number of dither sizes and the required number of phases but generally without regard for the frame patterns; and I may construct a basic pattern of sizes for Frame 1 according to the total number of sizes and generally without regard for the number of phases or the cycling of sizes. However, when I use ordered-dither frame patterns, I preferably avoid particular arrangements of the dither sizes in patterns that may result in dynamic artifacts such as visible texture crawls or large-area flickers.

Dither-Quantized Television Systems

Inasmuch as the referenced patents and prior applications have already described the use of dither-quantizing in analog systems transmitting composite signals typified by those of the NTSC system, and in PCM systems of digital television, I have elected to show in FIG. 14 a system of time-multiplexed analog components (MAC system) to illustrate use of the invention for color television, and persons skilled in the art will understand that the invention is useful in various other systems of television. MAC systems of prior art characteristically time-compress the signals representing a luminance component and two chrominance components, using compressing ratios that result in approximately equal bandwidths for all three compressed signals, and that permit the luminance and at least one chrominance signal to be transmitted sequentially during the period of one raster sweep, as shown in FIG. 14.

All horizontal axes of FIG. 14 represent time, and the three curves relate to the same section of one horizontal sweep. The top curve shows the lattermost part of a compressed luminance waveshape, labelled V, followed by the initial portion of a compressed chrominance waveshape, labelled W. (If the luminance and only one chrominance component are transmitted on a sweep, the luminance and the other component are sent on the next sweep, so that two chrominance components alternate line by line.)

The middle curve of FIG. 14 shows an idealized waveshape with positive and negative pulses, representing a cinematic dither signal DX. Although only five sizes of pulses are shown, and although they are arranged in a regular pattern, persons skilled in the art will understand that additional pulse sizes may appear on other lines and other frames, and that all pulse sizes may be in random sequence. Taking the full range of pulse sizes into account, the peak-to-peak dither signal amplitude is preferably adjusted to be slightly less than the interval between the amplitude quantum levels 61 shown at the bottom of FIG. 14. Inasmuch as V and W have substantially equal bandwidths, I generate the pulses of DX at a rate suitable for Nyquist sampling of both signals.

The dither signal DX is added to the time-compressed and time-multiplexed video components; the bottom curve of FIG. 14 shows idealized resultant waveshapes V+DX and W+DX, corresponding to dithered V and dithered W during the depicted time interval. The dithered signals are sampled in synchronism with the dither pulses and the amplitude of each sample is rounded off to the closest one of the quantum levels 61 which are also shown in the figure. The resultant dither-quantized samples, represented by circles 62, could be transmitted digitally to a receiver; alternatively, the stream of samples is low-pasas filtered to provide a continuous analog signal usable in compatible analog MAC receivers of prior art.

Inasmuch aas it is often preferable to quantize chrominance more coarsely than luminance, FIG. 14 shows W to have a smaller range of amplitudes than V. Suitable adjustment of amplifications to achieve such relationship permits a single quantizer (defined by the levels 61) to serve a luminance component and two chrominance components while providing more luminance levels than chrominance levels.

Whereas FIG. 14 applies to a particular system in which the invention can be used to advantage, persons skilled in the art will understand that the dithers and dither-generating means of the invention may be utilized in various other television systems sending dither-quantized signals. Unlike dither-quantized MAC, most other systems require a plurality of separate dithers when both luminance and chrominance are dither-quantized.

Those skilled in the art will also understand that, whereas dither-quantizing of the samples in a line of the TV display (e.g. of sampls 62 of FIG. 14) distorts the instantaneous video signals, the distortion so varies from line to line that each frame of the displayed television picture is approximated with stippled textures and pointillistic colors. They will also understand that 3-d dithers can have patterns of dither sizes that vary from frame to frame in such manner that stipple and pointillism are wholly or partly averaged out as persistence of vision fuses a series of successive frames. From another point of view, the human psychovisual system acts as a low-pass filter that attenuates artifacts resulting from these 3-d dithers while preserving the pictorial information. The efficacy and usefulness of the 3-d nasik dithers of prior art are limited by several factors, including a requirement that the number of phases by an integral pjower of 2. Cinematic dithers of the invention, on the other hand, can be constructed to repeat after any whole number of frames; hence, assuming 30 frames per second; for example, I can repeat, not only 15, 7.5, 3.75, etc., times per second as with 3-d nasik dithers of prior art, but also 10, 6, 5, 4.3, etc. times per sec., so that I can better match the characteristics of the human psychovisual filter under expected conditions of viewing. In accordance with the invention, I may also optimize the short-time frame-to-frame changes within the p-frame cycle and, contrary to prior art, dithers of the invention are not necessarily efficient for overcoming quantizing effects on individual frames.

It may be useful to recall that numbers written modulo X (or mod X) do not change value when an integral multiple of X is added or subtracted, and that modulo-X adders, subtracters, counters, etc. therefore represent all numbers in terms of only zero and the positive numbers less than X. For example, whereas the simple difference $(12-4)$ is $+8$ and the negative thereof $(8-12)$ is $-8$, in modulo 5 apparatus $(12-4)$ is denoted by 3 and $(4-12)$ is denoted by 2. Both $(12-4)$ and $(4-12)$ correspond to the same absolute difference.

Various modifications and alternatives to the specific structures set forth herein will be obvious to persons having ordinary skill in the art. Therefore, although the invention has been described in connection with several exemplary embodiments, this application is intended to cover any adaptations or variatios thereof; and it is manifestly intended that the invention be limited only by the claims and equivalents thereto.

I claim:

1. Means for generating a cinematic dither suitable for dither-quantizing a television signal, comprising:
   means generating a stream of signals representing a continually repeated series of dither samples, said series comprising p phases, said signals indicating one of Q discrete sizes for each dither sample, p and Q integers, signals of a first phase having sizes arranged in a certain arbitrary order corresponding to an arbitrary frame pattern;
   means for synchronizing successive phases with successive frames of said television signal; and
   means, including modulo-Q summing means, for modifying the signals of said first phase to produce for other phases signals corresponding to frame patterns other than said arbitrary pattern.

2. The means of claim 1 modifying the signals of said first phase and subsequent phases in such manner that sizes of successive dither samples occupying the same relative position in successive phases recur cyclically according to a repeating cycle with a fixed succession of sizes.

3. The means of claim 1 generating a phase wherein dither samples have sizes arranged in substantially random order, corresponding to a substantially random frame pattern.

4. The means of claim 1 wherein at least one of the integers p and Q is not an integral power of 2.

5. The means of claim 2 wherein said repeating cycle includes p/k different sizes, k an integer larger than zero.

6. The means of claim 5 wherein said repeating cycle corresponds to a constant difference modulo-Q between successive sizes.

7. Apparatus for generating a p-phase cinematic dither, p not less than three, suitable for dither-quantizing a television signal, said apparatus comprising:
   means for generating dither samples in terms of signals specifying discrete sample sizes, said means generating a first series of dither samples wherein specified sizes are arranged according to a first frame pattern and continually regenerating said series in synchronism with successive television frames;

means for counting television frames modulo p;

means for obtaining signals representing cumulative jumps in size as functions of at least the modulo p frame count;

means for altering the specified sizes of dither samples of said first series according to signals representing cumulative jumps in size, to obtain another arrangement of sizes correpsonding to a second frame pattern; and means for altering the specified sizes of dither samples of said first series according to signals representing cumulative jumps in size, to obtain another arrangement of sizes corresponding to a third frame pattern.

8. The apparatus of claim 7 including look-up table means for obtaining said signals representing cumulative jumps in size.

9. The apparatus of claim 7 wherein a cumulative jump in size is also a function of the specified size of the dither sample of said first series associated therewith.

10. The means of claim 5 including both a repeating cycle with p/j different sizes and a repeating cycle with p/k sizes, where j and k are unequal integers.

11. For providing an improved dither in a system transmitting a television signal, the means comprising:
(a) means for generating signals representing dither samples having Q different sizes in a repeating time series that includes p sub-series, each sub-series synchronous with a frame of said television signal and the entire series repeating after p frames, the sample occupying a specified ordinal position within one sub-series having size z; and
(b) means, including aarithmetic adder means, for modifying the signals of said one sub-series by size jumps, to generate a next-following sub-series of dither samples wherein the size of the sample occupying said specified ordinal position has size (z+h) modulo Q, h being the jump in size.

12. The means of claim 11 wherein each sub-series of said repeating time series has sample sizes arranged differently from the preceding sub-series.

13. The means of claim 11 wherein the jump h has constant value for all samples of all sub-series.

14. The means of claim 11 wherein p is greater than 2, and wherein the absolute value of the simple difference h−Q/2 is not larger than Q/p.

15. The means of claim 11 wherein Q=rp, r is an integer larger than zero, and h varies cyclically at each sample position such that the same series of h values repeats after p frames.

16. The means of claim 15 wherein the amount of the jump h depends on the size z that it augments modulo Q.

17. The means of claim 11 wherein each size z determines only one value of h.

18. The means of claim 15 wherein samples occupying different positions in a sub-series of samples change sizes in different manner, corresponding to different jump cycles.

19. The means of claim 11 wherein the sizes of the dither samples of a sub-series occur in random order.

20. The means of claim 11 wherein the samples of a sub-series have an order of sizes corresponding to an ordered-dither frame pattern.

21. The means of claim 20 wherein said ordered-dither frame pattern corresponds to horizontal and vertical repetition of the skewed dither matrix

| 0 | 5 | 8 |
|---|---|---|
| 7 | 2 | 4 |
| 3 | 6 | 1 | the numerals representing dither sizes in relation to the scanning raster, and wherein additional frame patterns are produced by means of size jumps corresponding to repeated modulo 9 addition of 3 to said matrix.

22. The means of claim 11 further comprising means for dither-quantizing a television signal.

23. The means of claim 11 wherein Q and p are integers larger than unity, h is an integer larger than zero, and at least one of Q, p and h is not an integral power of 2.

24. A method for producing a cinematic dither suitable for dither-quantizing quantizing a television signal, comprising:
producing first signals corresponding to a first arrangement of integers in the range from 0 to Q-1 inclusive;
producing second signals representing numbers
deriving signals corresponding to another arrangement of integers by means including summing means responsive to said first and said second signals and effectively adding modulo-Q the represented numbers to integers of said first arrangement;
producing, for a first frame of a television signal, a series of dither samples having sizes arranged according to said first arrangement of integers; and
producing, for another frame of said television signal, another series of dither samples having sizes arranged according to said another arrangement of integers.

25. The method of claim 23 wherein all numbers represented by said second signals differ from Q/2 by an absolute difference not larger than Q/p, p an integer larger than unity, and are such that said first arrangement of integers recurs every p frames.

26. The method of claim 23 wherein second signals represent numbers that vary according to the integer of said first arrangement being added to.

27. The method of claim 23 wherein said first signals correspond to integers arranged in substantially random order.

28. The method of claim 23 said first signals correspond to integers in such arrangement that raster scanning results in a regular pattern of dither sizes in relation to the scanning raster.

29. A method for producing a multi-phase cinematic dither signal suitable for dither-quantizing a television signal, said method comprising the steps of:
(a) producing, in synchronism with a first television frame, a phase signal representing a first set of dither samples, the size of each sample being one of a limited number of discrete sizes, sizes of the set occurring serially according to a first order of sizes; and
(b) producing, in synchronism with the next television frame, a phase signal representing a second set of dither samples wherein the aforesaid discrete sizes are arranged serially such that the size of the dither sample occupying any ordinal position therein is unambiguously specified by only the size of the dither sample having the same ordinal position in the first set.

30. The method of claim 29 producing additional phase signals representing additional sets of dither samples arranged in such manner that every pair consisting of a set and its immediate successor has the relation of said first and second sets, and such that said first phase signal recurs periodically after a fixed number of television frames.

31. A method for improving transmission of television information in terms of time-multiplexed analog components, said method comprising steps of:
   (a) generating one cinematic dither characterized by a repeating sequence of phases including non-identical first, second and third phases in direct succession; each of said three phases comprising signals representing a corresponding set of first-phase, second-phase or third-phase dither samples with all samples limited to a fixed number of discrete sizes; each second-phase sample being correlated with both a first-phase sample and a third-phase sample; the size of each second-phase sample being uniquely determined by only the size of its correlated first-phase sample, and the size of each third-phase sample being uniquely determined by only the size of its correlated first-phase sample, and the size of each third-phase sample being uniquely determined by only the size of its correlated second-phase sample; the relations of third-phase sample sizes to second-phase sample sizes being the same as the relations of second-phase sample sizes to first-phase sample sizes;
   (b) dithering with said one cinematic dither a time-multiplex signal incorporating said time-multiplexed analog components; and
   (c) quantizing the dithered signal to obtain a dither-quantized signal.

32. The method of claim 23 wherein the same number is added modulo Q to all integers of said first arrangement.

33. An improved method for dither-quantizing a television signal, including steps of:
   (a) dithering said signal by combining it with an improved dither,
   said improved dither a cinematic dither including p phases, p not less than three, in a sequency repeated cyclically, each phase comprising signals representing a set of dither samples individually correlated with individual elements of an array of elements that is co extensive with a television picture area and remains fixed for all phases, said signals indicating one of a number of different sizes for each dither sample;
   said improved dither characterized by a first phase, synchronous with a first frame of the television signal, wherein dither-sample sizes are configured according to a first frame pattern in relation to the aforesaid array, and further characterized by subsequent phases, synchronous with subsequent television frames, wherein dither-sample sizes are configured according to other frame patterns;
   said first and other frame patterns being such that the size of a dither sample of one phase is a function of only the size of the dither sample correlated with the same array element during the immediately preceding phase;
   said frame patterns also being such that the $(p+1)$th frame pattern is the same as the first frame pattern; and
   (b) quantizing the dithered signal according to discrete quantum levels.

34. The method of claim 33 wherein said improved dither is such that, with Q dither-sample sizes denoted by the integers from 0 to Q-1 inclusive, the modulo Q difference between the size of a dither sample of one phase and the size of said correlated dither sample of the next following phase is the same for all sizes and all phases.

35. The method of claim 33 wherein said improved dither is such that, with Q dither-sample sizes denoted by the integers from 0 to Q−1 inclusive, the modulo Q difference between the size of a dither sample of one phase and the size of said correlated dither sample of the immediately preceding phase is not less than $Q/2 - Q/p$ and not more than $Q/2 + Q/p$.

36. A method for providing an improved cinematic dither suitable for a television system, comprising the steps of:
   (a) recording on a record medium dither signals corresponding to a series of p phases, signals of each phase representing a set of dither samples and indicating one of a number of different sizes for each sample;
   including a first recorded phase having dither-sample sizes arranged according to a first frame pattern, and subsequent recorded phases having dither-sample sizes arranged according to other frame patterns;
   said other frame patterns being such that the size of a dither sample occupying a particular arrangement position of one phase is a function of only the size of the dither sample occupying the corresponding arrangement position of the immediately preceding phase, the size of a dither sample occupying a particular arrangement position of the first phase is likewise a function of only the size of the corresponding dither sample of the pth phase, and the functional relations are the same for all such pairs of phases;
   (b) synchronizing read-out means with television sync signals; and
   (c) reading out said dither signal repetitively such that, for any value of n, the $(p+n)$th phase, synchronous with the $(p+n)$th television frame, is the same as the nth phase, synchronous with the nth frame.

37. A method for generating an improved cinematic dither for television, including the steps of:
   generating signals representing a set of first-phase dither samples, each sample having one of Q discrete sizes arbitrarily denotable by integers from 0 to Q−1, sizes of the set being in a configuration corresponding to a particular frame pattern; and
   generating signals representing a second-phase dither sample corresponding to each first-phase dither sample, said signals being such that the size of a second-phase sample is denoted $(z+c)$ modulo Q when the size of the corresponding first-phase sample is denoted z, c being a constant positive integer and modulo Q indicating that Q is subtracted whenever the sum $z+c$ exceeds Q.

38. The method of claim 37 wherein $Q=aP$, a and P being integers with P odd, and wherein sets of second-, third-, and subsequent-phase dither samples are generated by repeated modulo Q addition of a size difference c equal to a selected one of the quantities $Q/2+a/2$ and $Q/2-a/2$, thereby obtaining P different frame patterns in a continually repeating sequence.

39. For generating a dither corresponding to a continually repeating series of at least three different frame patterns and comprising dither samples having amplitudes limited to a fixed number of discrete sizes, a method including steps of:
producing signals corresponding to a set of dither samples with sizes arranged in a configuration corresponding to a first frame pattern; anda
for subsequent frame patterns, producing signals corresponding to sets of dither samples with sizes so arranged that the size of each sample of any set is unambiguously specified by only the size of a correlated dither sample of the set immediately previous thereto.

40. A method for generating a cinematic dither having three or more phases and suitable for television, comprising the steps of:
(a) producing signals representing a first set of dither samples wherein each sample is correlated with one element of an array of elements fixed in relation to the picture area of a television display; and wherein a dither sample is represented to have size $rx_1$ plus y, r being an integer not less than 2 and p an integer not less than 3; $x_1$ being whichever of the integers from 0 to p−1 inclusive is assigned as $x_1$ to the array element correlated with said sample, and y being whichever of the integers from 0 to r−1 inclusive is assigned to the same array element; values of $x_1$ being assigned to the elements of said array according to an arbitrary pattern and values of y being assigned to the same elements according to an arbitrary pattern;
(b) producing signals representing a second set of dither samples wherein each sample is correlated with an element of the aforesaid fixed array and is represented to have size $rx_2$ plus y, where $x_2$ is an integer in the range from 0 to p−1 inclusive and its particulara value is specified uniquely by the value of $x_1$ assigned to the correlated element; and
(c) producing signals representing a third set of dither samples wherein each sample is likewise correlated with an element of the aforesaid fixed array and is represented to have size $rx_3$ plus y, where values of $x_3$ are determined by values of $x_2$ as values of $x_2$ are determined by values of $x_1$.

41. The method of claim 40 also including the step of synchronizing successive signals representing different sets of dither samples with successive television frames, and arranging integer assignments such that every set of samples is represented in any series of p successive frames.

42. The method of claim 40 assigning integer values in a regular pattern to the elements of said fixed array.

43. The method of claim 40 assigning integer values in substantially random pattern to the elements of said fixed array.

44. The method of claim 40 producing digital signals to represent dither samples and their sizes.

45. The method of claim 40 producing analog signals to represent dither samples and their sizes.

46. The method of claim 42 arranged to produce first and subsequent sets of dither samples wherein sizes are correlated with said fixed array according to first and subsequent ordered dither frame patterns defined by any of the sets of ordered dither matrices shown in FIG. 10A, FIG. 10D, FIG. 11B and FIG. 11C.

47. The method of claim 42 assigning values of $x_1$ to the elements of said array according to a substantially random pattern and assigning values of y to said elements in a regular pattern.

48. Means for generating a cinematic dither having three or more phases and suitable for television, comprising:
(a) means for producing signals representing a first set of dither samples such that each sample is correlated with one element of an array of elements fixed in relation to the picture area of a television display and such that each dither sample is represented to have size $rx_1$ plus y; r being an integer greater than unity and p an integer greater than 2, $x_1$ being one of the integers from 0 to p−1 inclusive assigned as $x_1$ to the array element correlated with said sample, and y being one of the integers from 0 to r−1 inclusive assigned to the same array element; values of $x_1$ being assigned to the elements of said array according to a selected pattern and values of y being assigned to the same elements according to a selected pattern;
(b) means for producing signals representing a second set of dither samples such that each sample is correlated with an element of the aforesaid fixed array and is represented to have size $rx_2$ plus y, where $x_2$ is an integer in the range from 0 to p−1 inclusive and its particular value is specified uniquely by the value of $x_1$ assigned to the correlated element; and
(c) means for producing signals representing a third set of dither samples wherein each sample is likewise correlated with an element of the aforesaid fixed array and is represented to have size $rx_3$ plus y, where values of $x_3$ are determined by values of $x_2$ as values of $x_2$ are determined by values of $x_1$.

49. The means of claim 48 including means for synchronizing successive signals representing different sets of dither samples with successive television frames, and arranged so that every set of samples is represented in any series of p successive frames.

* * * * *